UNITED STATES PATENT OFFICE.

OTTO EINAR GELERTSEN, OF WESTFIELD, NEW JERSEY, ASSIGNOR TO GREENFIELD PAPER BOTTLE COMPANY, OF NEW YORK, N. Y., A CORPORATION OF NEW JERSEY.

WATERPROOFING COMPOSITION.

1,204,149.     Specification of Letters Patent.     Patented Nov. 7, 1916.

No Drawing.     Application filed October 28, 1915. Serial No. 58,370.

*To all whom it may concern:*

Be it known that I, OTTO EINAR GELERTSEN, a subject of the King of Sweden, and a resident of Westfield, county of Union, and State of New Jersey, have made a certain new and useful Invention Relating to Waterproofing Compositions, of which the following is a specification.

The invention relates to a composition which is utilized as a waterproofing for the paper of which receptacles or bottles are made for containing foods, preferably in liquid form. The composition also has the characteristic that it can be utilized as a gluing medium for securing different portions of the paper.

This composition comprises as an essential element thereof resin and one object of the invention is to purify the resin in such a manner that no objectionable odor, disagreeable taste or injurious effects will be imparted to the contents of the receptacle or bottle.

The composition can be applied to the paper so as to form a coating thereupon, or it can be applied to the paper in a manner to impregnate the paper, if the paper has such characteristics as will permit the composition to impregnate the paper.

A composition which has been found to be practical to serve both as a waterproofing and as a gluing medium comprises resin and paraffin or other hydrocarbons. The resin itself gives a brittleness to the composition and as in some forms it is quite sticky it can be relied upon to impart to the composition the gluing effect desired. Fresh or natural resin by itself would be too sticky and the paraffin or other hydrocarbon is added to reduce to a proper degree the adhesiveness of the resin. In case the mixture of resin and paraffin is too soft carnauba wax can be added. The proportions which I have found to be practical to serve the desired end comprises, principally, resin approximately 74% to 75%, paraffin or other hydrocarbon substantially not over 25% and the carnauba wax which may be added runs from about ½% to 1%. It will therefore be observed that the major portion of the composition is resin, which is modified in its effect by the paraffin and wax in the manner indicated.

One feature of this composition when applied to one side of a paper is that it is quite sticky, while the other side of the paper, although fully waterproof, will remain practically non-adhesive.

As stated above, one of the objects of the invention is to produce resin in such purified form that objectionable odors or taste will not be emitted therefrom to the contents of a container when the resin has been included as a component part of the waterproofing composition, and one of the features of this invention is to remove such impurities out of resin that cannot be extracted by mechanical means, such as filtration, distillation, etc., without impairing the quality of the resin.

The desired end can be attained and is based upon the fact that turpentine, resin oil and other impurities that give the resin a certain odor and taste are soluble in such liquid solvents as ether, benzin, gasolene, carbon-tetrochlorid and other solvents of a similar class which do not mix with water and aqueous solutions.

The process also depends upon the further fact that resin acids when saponified by means of aqueous solutions containing soda, or other metallic compounds, are insoluble in solvents, such as ether, benzin, etc., and this makes it possible to separate the impurities from the resin soap by washing with the solvents, such as ether, etc. In practice the process is carried out, for instance, by dissolving the resin—preferably in the sticky form as it is taken from the tree—in benzin or gasolene, filtering off the insoluble impurities, saponifying the resin in the solution by the addition of an aqueous solution containing caustic soda or soda ash, after which addition the mixture is stirred up, so as to wash the resin by absorbing the impurities, after which washing the mixture is allowed to settle. The liquid separates into two parts, the upper one containing the gasolene or benzin and impurities of the resin and the lower one containing the water solution of washed or clean saponified resin. The water solution of saponified resin is then drawn off and to this there is added one of the mineral acids, for instance sulfuric acid, by which the resin is precipitated, after which the liquid can be withdrawn in any suitable manner leaving the pure resin.

Another way of obtaining pure resin is to saponify the resin first and remove the essential insoluble compounds by filtration and then extract the impurities from the soap by the use of benzin, gasolene or the like and proceed as described above for extracting the purified resin.

It will also be noted that resin size—which is a neutral resin soap—can be dissolved in water, gasolene may be added and the mixture stirred up and allowed to settle and the resin can be removed as previously indicated.

The improvements herein set forth are not limited to the precise construction and arrangement shown and described for they may be embodied in various forms and modifications without departing from the spirit and scope of the invention.

What I claim is:

1. A waterproofing composition comprising in combination resin and hydrocarbon wax, the latter up to but not exceeding 25%, said composition also comprising carnauba wax from ½ to 1%.

2. A waterproofing composition comprising approximately 75% of resin and 25% of paraffin.

3. A waterproofing composition comprising 75% or over of resin, substantially the remainder of the composition being hydrocarbon wax.

4. A waterproofing composition comprising 75% or over of resin, substantially the remainder of the composition being a hydrocarbon wax, the composition also comprising a small percentage of carnauba wax.

This specification signed and witnessed this 25th day of October, A. D., 1915.

OTTO EINAR GELERTSEN.

Signed in the presence of—
W. C. KRESS,
MABEL T. MYERS.